US009970530B2

(12) United States Patent
Polan

(10) Patent No.: US 9,970,530 B2
(45) Date of Patent: May 15, 2018

(54) VEHICLE SHIFTER POSITION SENSOR ASSEMBLY

(71) Applicant: Eugene H Polan, Madison Heights, MI (US)

(72) Inventor: Eugene H Polan, Madison Heights, MI (US)

(73) Assignee: FCA US LLC, Auburn Hills, MI (US)

( * ) Notice: Subject to any disclaimer, the term of this patent is extended or adjusted under 35 U.S.C. 154(b) by 190 days.

(21) Appl. No.: 14/994,447

(22) Filed: Jan. 13, 2016

(65) Prior Publication Data

US 2017/0198806 A1 Jul. 13, 2017

(51) Int. Cl.
*B60K 20/00* (2006.01)
*F16H 59/04* (2006.01)
*F16H 59/10* (2006.01)
*F16H 59/02* (2006.01)

(52) U.S. Cl.
CPC ......... *F16H 59/044* (2013.01); *F16H 59/105* (2013.01); *F16H 2059/0269* (2013.01)

(58) Field of Classification Search
CPC ................. F16H 59/044; F16H 59/105; F16H 2059/0269; F16H 59/0217
See application file for complete search history.

(56) References Cited

U.S. PATENT DOCUMENTS

| | | | | | |
|---|---|---|---|---|---|
| 3,621,725 A | * | 11/1971 | Emmel et al. | ........... | G05G 1/00 359/233 |
| 3,679,846 A | * | 7/1972 | Dillon | ................... | H01H 25/04 200/556 |
| 4,199,747 A | * | 4/1980 | Miller | ..................... | F16H 63/42 200/61.88 |
| 4,912,997 A | * | 4/1990 | Malcolm | ............... | F16H 59/044 338/128 |
| 5,325,083 A | * | 6/1994 | Nassar | .................. | F16H 59/105 137/554 |
| 5,410,931 A | * | 5/1995 | Pecceu | .................. | F16H 59/044 74/335 |
| 5,847,344 A | * | 12/1998 | Denyer | ................. | F16H 59/105 200/61.88 |
| 6,644,142 B2 | * | 11/2003 | Junge | .................. | F16H 59/0204 74/473.18 |
| 7,141,812 B2 | * | 11/2006 | Appleby | ............... | B29C 33/302 250/505.1 |

(Continued)

*Primary Examiner* — Zakaria Elahmadi
(74) *Attorney, Agent, or Firm* — Ralph E. Smith

(57) ABSTRACT

A transmission gear shifter arrangement includes a shift lever assembly and a position sensor assembly each associated with a shifter housing. The shift lever assembly is operably coupled to a vehicle transmission, and is selectively movable to gear select positions corresponding to respective transmission gears. The position sensor assembly includes a light source and light sensor, where the sensor is configured to selectively receive light emitted from the light source. When the shift lever assembly is in a predetermined one of the gear select positions, the shift lever assembly enables light emitted from the light source to reach the sensor thereby indicating that the shift lever assembly is in the predetermined one of the gear select positions, and when the shift lever assembly is not in the predetermined one of the gear select positions, the shift lever assembly prevents light emitted from the light source from reaching the sensor.

14 Claims, 3 Drawing Sheets

(56) References Cited

U.S. PATENT DOCUMENTS

| | | | | |
|---|---|---|---|---|
| 7,900,534 B2* | 3/2011 | Kusayama | ............... | F16H 59/02 |
| | | | | 74/471 XY |
| 8,451,109 B1* | 5/2013 | Daniel | ................... | B62D 1/046 |
| | | | | 340/438 |
| 8,485,059 B2* | 7/2013 | Peukert | ................... | F16H 59/02 |
| | | | | 74/473.12 |
| 2004/0237692 A1* | 12/2004 | Syamoto | ............. | F16H 59/0204 |
| | | | | 74/473.12 |
| 2009/0060765 A1* | 3/2009 | Kuwabara | ................. | F04B 1/14 |
| | | | | 417/462 |
| 2009/0091313 A1* | 4/2009 | Teeters | ................ | B60Q 1/1476 |
| | | | | 324/207.16 |
| 2010/0282014 A1 | 11/2010 | Panizza | | |
| 2011/0056318 A1* | 3/2011 | Rake | ................... | F16H 59/0278 |
| | | | | 74/473.12 |
| 2012/0152049 A1* | 6/2012 | Benson | ................ | F16H 59/044 |
| | | | | 74/473.3 |
| 2013/0340557 A1* | 12/2013 | Iwata | ....................... | G01B 7/14 |
| | | | | 74/473.12 |
| 2015/0068343 A1* | 3/2015 | Tokumo | ............. | F16H 61/0213 |
| | | | | 74/473.12 |
| 2016/0123460 A1* | 5/2016 | Tsukazaki | ............. | F16H 59/105 |
| | | | | 74/473.23 |
| 2016/0138705 A1* | 5/2016 | Kim | ................... | F16H 59/0217 |
| | | | | 74/473.2 |
| 2016/0146333 A1* | 5/2016 | Jeon | ........................ | G05G 5/03 |
| | | | | 74/473.12 |
| 2016/0169373 A1* | 6/2016 | Jeong | ................. | F16H 59/0204 |
| | | | | 74/473.33 |

* cited by examiner

VEHICLE SHIFTER POSITION SENSOR ASSEMBLY

FIELD

The present application relates generally to vehicle gear shift assemblies and, more particularly, to a position sensor assembly for a vehicle gear shifter assembly.

BACKGROUND

Vehicle transmissions typically include an associated selector lever or shifter that allows the driver of the vehicle to engage the transmission in one of a series of predetermined transmission settings such as park, reverse, neutral, and one or more drive settings. Position sensors may be used to provide an electronic signal that corresponds to the physical position of the selector lever or the selected transmission setting. Such position sensors include, for example, limit switches, microswitches, and proximity sensors. However, such switches and sensors are typically expensive and of a size that dictates a larger shifter housing, and also may be subject to potential durability and noise, vibration, and harshness issues. Accordingly, while such conventional vehicle gearshift systems work for their intended purpose, there remains a need for improvement in the relevant art.

SUMMARY

According to an aspect of the invention, a transmission gear shifter arrangement is provided. In an exemplary implementation, the transmission gear shifter arrangement includes a shift lever assembly associated with a shifter housing and configured to operably couple to a vehicle transmission, the shift lever assembly being selectively movable to a plurality of gear select positions corresponding to a respective plurality of transmission gears. The arrangement further includes a position sensor assembly associated with the shifter housing and having a light source and a light sensor, the light sensor configured to selectively receive light emitted from the light source. When the shift lever assembly is in a predetermined one of the plurality of gear select positions, the shift lever assembly enables light emitted from the light source to reach the light sensor thereby indicating that the shift lever assembly is in the predetermined one of the plurality of gear select positions, and when the shift lever assembly is not in the predetermined one of the plurality of gear select positions, the shift lever assembly prevents light emitted from the light source from reaching the light sensor.

In some implementations, the shift lever assembly includes a passage formed therethrough, and when the shift lever assembly is in the predetermined one of the plurality of gear select positions, the passage receives the light emitted from the light source thereby enabling the light to reach the light sensor. In this exemplary implementation the shift lever assembly includes a gear shift lever having a pivot ball, with the passage being formed therethrough. In this exemplary implementation, the shifter housing includes a socket configured to pivotably receive the pivot ball, and the light source and light sensor are coupled to the housing on opposed sides of the socket and in optical communication with the socket such that when the shift lever assembly is in the predetermined one of the plurality of gear select positions, the passage, the light source, and the light sensor are aligned.

In some implementations, the housing includes a light source passage and an opposed light sensor passage, where the light source is disposed in the light source passage and the light sensor is disposed in the light sensor passage. In this exemplary implementation, the shift lever assembly includes a gear shift lever having the pivot ball and the pivot ball passage formed therethrough such that when the shift lever assembly is in the predetermined one of the plurality of gear select positions, the pivot ball passage, the light source passage, and the light sensor passage are aligned. In one exemplary implementation, the predetermined one of the plurality of gear select positions is a neutral gear position.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
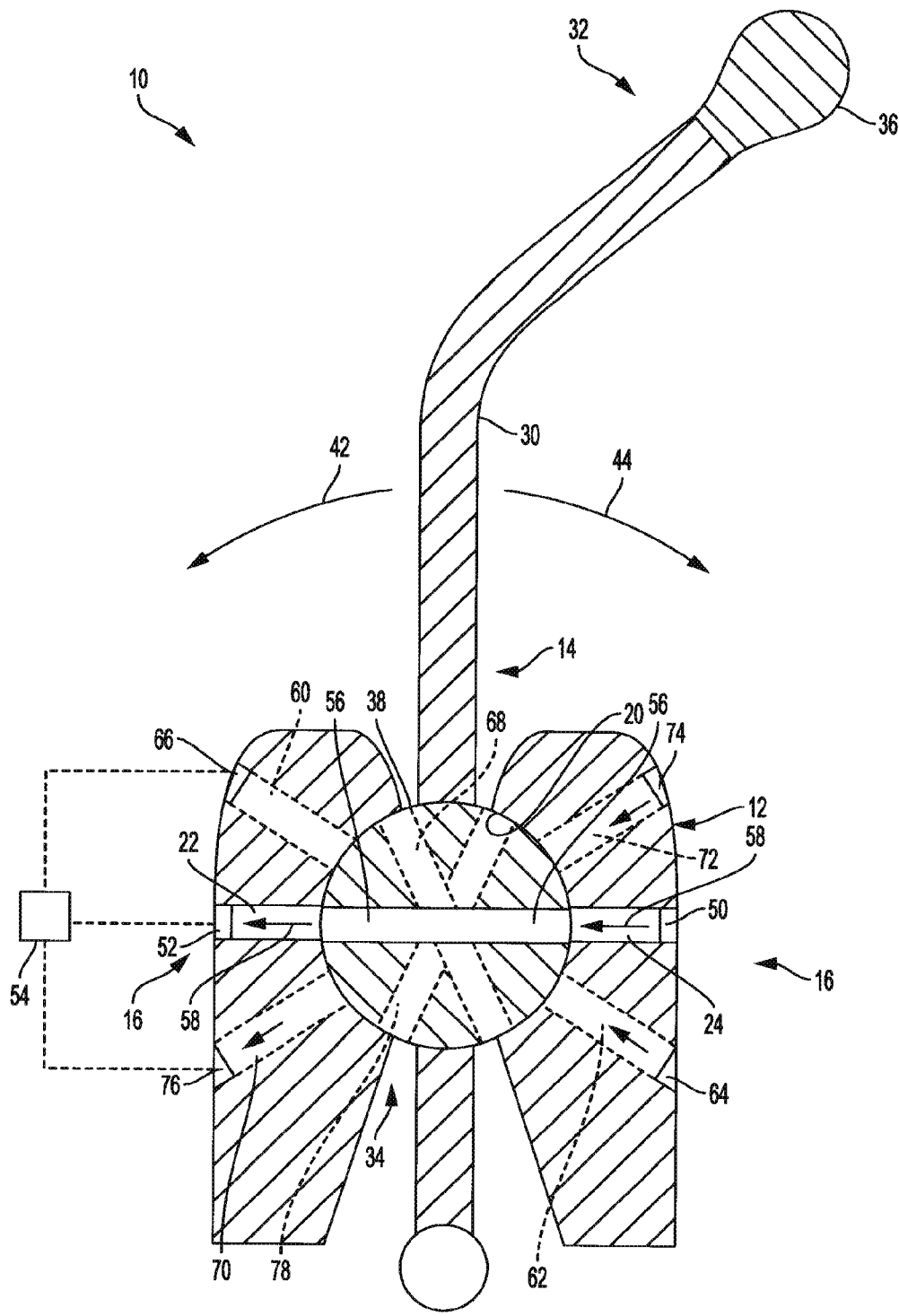
FIG. 1 is a side cross-sectional view of an exemplary manual transmission gear shifter assembly for a vehicle in accordance with the principles of the present disclosure.
Figure 3:
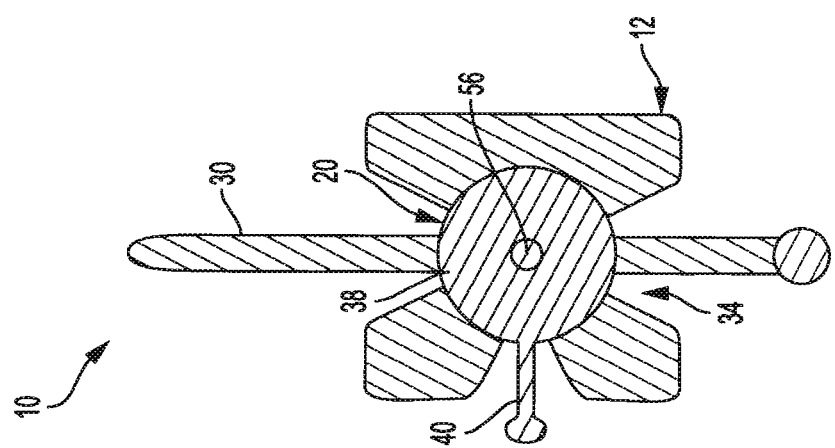
FIG. 3 is a rear cross-sectional view of the gear shifter assembly shown in FIGS. 1 and 2 in accordance with the principles of the present disclosure.
Figure 2:
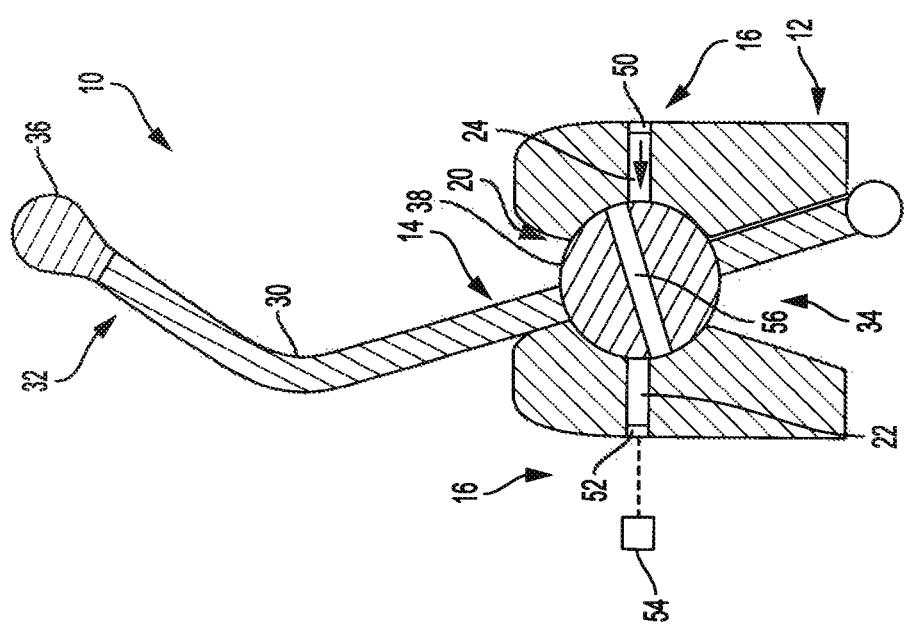
FIG. 2 is another side cross-sectional view of the gear shifter assembly shown in FIG. 1 in accordance with the principles of the present disclosure.

With initial reference to FIGS. 1-3, an exemplary manual transmission gear shifter arrangement for a vehicle is illustrated and generally identified at reference numeral 10. Manual transmission gear shifter arrangement 10 includes a housing 12, a shift lever assembly 14, and a position sensor assembly 16.

The housing 12 is configured to at least partially receive shift lever assembly 14 and generally includes pivot ball socket or cavity 20, a position sensor passage 22, and a light source passage 24, as will be discussed herein in greater detail.

The shift lever assembly 14 is at least partially disposed within housing 12 and generally includes a gear shift lever 30 having a first end 32 and a second end 34. First end 32 includes a shift knob 36 configured to be engaged and manipulated by a vehicle driver, and second end 34 includes a pivot ball 38 and a lever 40 (FIG. 3). Pivot ball 38 is rotatably disposed within pivot ball cavity 20 such that gear shift lever 30 is movable through a groove or shift gate (not shown), which facilitates selection of, for example, six forward gears, a reverse gear, and a neutral gear.

The driver's operation of shift lever 30 is translated to the transmission through both a fore/aft shifting motion and a cross-car selection motion. The shifting motion determines whether the transmission is placed in a neutral position or an in-gear position. A cable or a rod (not shown) may be attached at a first end to gear shift lever 30 proximate a fore/aft pivot point such as pivot ball 38, and a second end of the cable/rod is coupled to a lever on the transmission (not shown). Lever 40 is utilized to select which fore/aft plane will be used for the shifting motion. Alternatively, shift lever assembly 14 could be electronically coupled to the vehicle transmission in a shift by wire arrangement. Although shift lever assembly 14 is described with a pivot ball 38, manual transmission gear shifter arrangement 10 may include various other types of shift lever assemblies such as ball, yoke or trunnion pivots or any combination thereof.

FIG. 1 illustrates gear shift lever 30 in the neutral gear position, which is arranged in the center or middle of the shift gate, in a commonly known "H" pattern (not shown). As shown in FIG. 2, gear shift lever 30 is movable in a forward direction 42 from the neutral gear position to orient the lever in a forward or reverse gear position. Similarly, gear shift lever 30 is movable in a rearward direction 44 from the neutral gear position to orient the lever in a forward or reverse gear position. Although described herein as an "H" pattern, housing 12 may have any suitable shift gate pattern that enables manual transmission gear shifter arrangement 10 to function as described herein.

In an exemplary implementation, position sensor assembly 16 is configured to determine the gear setting or position of manual transmission gear shifter arrangement 10 and generally includes a light source 50, a light sensor 52, and a controller 54. Light source 50 is disposed within or proximate to light source passage 24, and light sensor 52 is disposed within or proximate to position sensor passage 22. In the exemplary implementation, light source 50 is an LED and light sensor 52 is configured to detect light emitted from source 50. However, light source 50 may be any suitable light source that enables manual transmission gear shifter arrangement 10 to function as described herein. Pivot ball 38, which is disposed between position sensor passage 22 and light source passage 24, includes a passage 56 extending therethrough. In this exemplary implementation, position sensor assembly 16 is associated with housing 12.

As used herein, the term controller refers to an application specific integrated circuit (ASIC) and/or an electronic circuit, a processor (shared, dedicated, or group) and memory that executes one or more software or firmware programs, a combinational logic circuit, and/or other suitable components that provide the described functionality.

As shown in FIG. 1, when gear shift lever 30 is in the neutral gear position, pivot ball passage 56 is aligned with both position sensor passage 22 and light source passage 24 such that a path of travel (e.g., a direct line of sight) is established between light source 50 and light sensor 52. As such, light is emitted along an axis 58 to light sensor 52, and light sensor 52 reacts to the emitted light and produces a signal indicating that gear shift lever 30 is in the neutral position. This signal may then be sent to controller 54, which may then utilize the sensed position for further applications, such as vehicle stop/start applications.

As shown in FIG. 2, when gear shift lever 30 is in a forward or reverse gear position, pivot ball passage 56 is not aligned with position sensor passage 22 and light source passage 24 such that light emitted by light source 50 does not have a path of travel to light sensor 52 (i.e., the path is blocked by pivot ball 38). Accordingly, light sensor 52 does not sense the light emitted from source 50, thereby producing a signal (or no signal) indicating that gear shift lever 30 is in a non-neutral position such as forward or reverse gear. As such, when shift lever 30 is in a predetermined position (e.g., neutral), shift lever 30, via pivot ball 38 and passage 22, enables light emitted from light source 50 to reach light sensor 52, and when shift lever 30 is not in the predetermined position, shift lever 30 prevents light emitted from light source 50 from reaching light sensor 52.

In an exemplary implementation, manual transmission gear shifter arrangement 10 may be configured to determine if gear shift lever 30 is in a forward/reverse gear position in the forward direction 42 such as reverse, first, third, and fifth, gears. Housing 12 may further include a position sensor passage 60 and a light source passage 62, which are each angled relative to pivot ball passage 56. Position sensor assembly 16 may further include a light source 64 and a light sensor 66, and pivot ball 38 may further include a passage 68 (see FIG. 1).

In this exemplary implementation, when gear shift lever 30 is in the forward/reverse gear position in forward direction 42, pivot ball passage 68 is aligned with both position sensor passage 60 and light source passage 62 such that light emitted by light source 64 has a path of travel to light sensor 66. Accordingly, light sensor 66 reacts to the emitted light and produces a signal indicating that gear shift lever 30 is in the forward/reverse position. This signal may then be sent to controller 54 for further applications or processing.

Continuing with this exemplary implementation, when gear shift lever 30 is in the neutral gear position or in the forward/reverse gear position in rearward direction 44, pivot ball passage 68 is not aligned with position sensor passage 60 and light source passage 62 such that light emitted by light source 64 does not have a path of travel to light sensor 66 (see FIG. 1). Accordingly, light sensor 66 does not sense the light emitted from source 64, thereby producing a signal (or no signal) indicating that gear shift lever 30 is in a position other than forward/reverse gear in forward direction 42. Alternatively, passage 56 may be configured to align with position sensor passage 60 and light source passage 62 when the shifter is positioned in a particular gear range, thereby negating the need for passage 68.

In an exemplary implementation, manual transmission gear shifter arrangement 10 may be configured to determine if gear shift lever 30 is in a forward/reverse gear position in rearward direction 44 such as reverse (if not associated with forward direction 42), second, fourth, and sixth gears. Housing 12 may further include a position sensor passage 70 and a light source passage 72, which are each angled relative to pivot ball passage 56. Position sensor assembly 16 may further include a light source 74 and a light sensor 76, and pivot ball 38 may further include a passage 78 (see FIG. 1).

When gear shift lever 30 is in a forward/reverse gear position in rearward direction 44, pivot ball passage 78 is aligned with both position sensor passage 70 and light source passage 72 such that light emitted by light source 74 has path of travel to light sensor 76. Accordingly, light sensor 76 reacts to the emitted light and produces a signal indicating that gear shift lever 30 is in the forward/reverse position. This signal may then be sent to controller 54 for further applications.

When gear shift lever 30 is in the neutral gear position or in the forward/reverse gear position in forward direction 42, pivot ball passage 78 is not aligned with position sensor passage 70 and light source passage 72 such that light emitted by light source 74 does not have a path of travel to light sensor 76. Accordingly, light sensor 76 does not sense the light emitted from source 74, thereby producing a signal (or no signal) indicating that gear shift lever 30 is in a position other than forward/reverse gear in rearward direction 44. Alternatively, passage 56 may be configured to align with position sensor passage 70 and light source passage 72 when the shifter is positioned in a particular gear range, thereby negating the need for passage 78.

In an exemplary implementation, housing 12 may not include position sensor passages or light source passages. Instead, light source 50, 64, 74 and sensor 52, 66, 76 may be positioned on or in a wall defining pivot ball cavity 20 and in optical communication with cavity 20, where the wall may be part of or separate from housing 12. Alternatively, one of light source 50 and light sensor 52 may be positioned on shift lever assembly 14 while the other is positioned on housing 12. Alternatively still, position sensor assembly 16 may utilize a single light source 50 (as well as a single light source passage) to direct light through pivot ball passages 56, 68, and/or 78 to respective light sensors 52, 66, 76. As such, light source 50 and light sensor 52 may be positioned in various locations such that selective movement of gear shift lever 30 either creates or breaks a direct line of sight or path of travel between light source 50 and sensor 52 to enable determining the gear position of shift lever 30.

Figure 4:
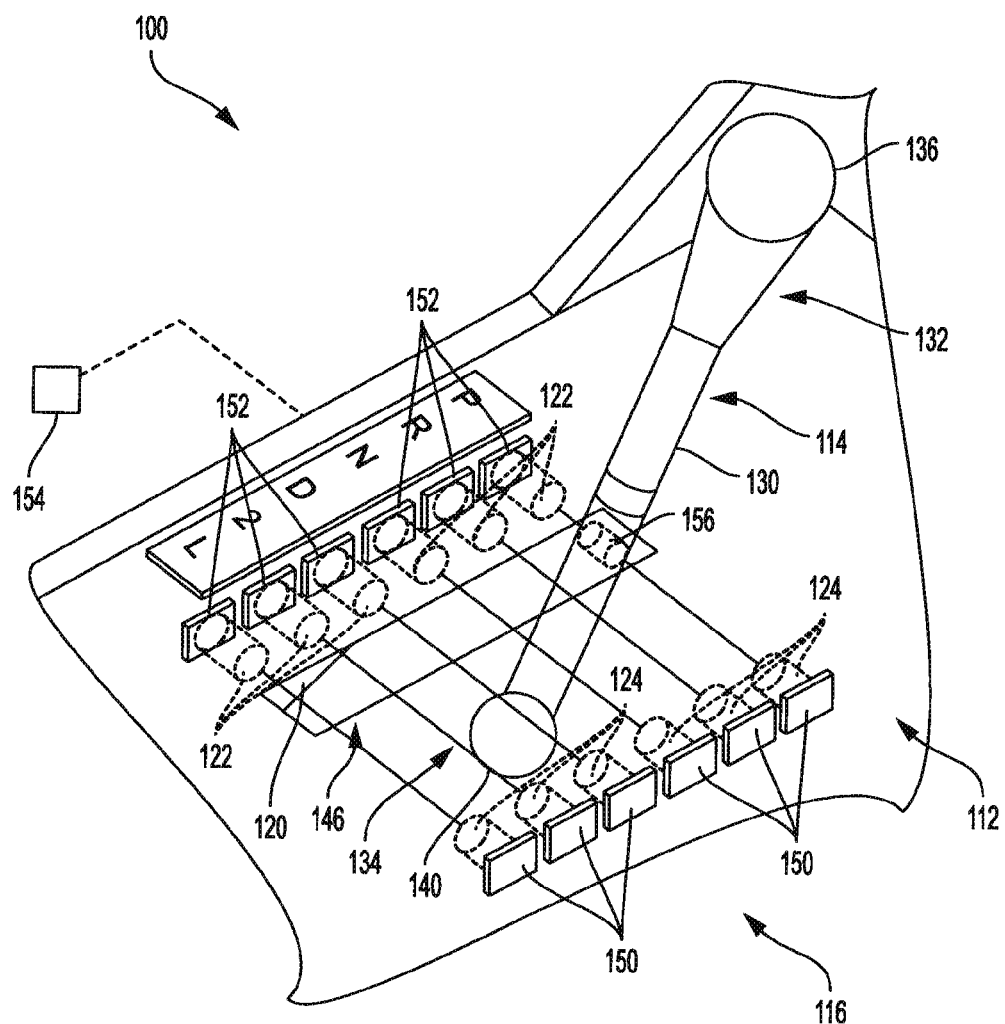
FIG. 4 is a cross-sectional view of an exemplary automatic transmission gear shifter assembly for a vehicle in accordance with the principles of the present disclosure.

FIG. 4 illustrates an exemplary automatic transmission gear shifter arrangement 100 for a vehicle. Automatic transmission gear shifter arrangement 100 generally includes a housing 112, a shift lever assembly 114, and a position sensor assembly 116.

The housing 112 is configured to at least partially receive shift lever assembly 114 and generally includes a shaft cavity 120, and one or more corresponding position sensor passages 122 and light source passages 124.

The shift lever assembly 114 is at least partially disposed within housing 112 and generally includes a gear shift lever 130 having a first end 132 and a second end 134. First end 132 includes a shift knob 136 configured to be engaged and manipulated by a vehicle driver, and second end 134 includes a pivot ball 140. A cable or a rod (not shown) may be attached at a first end to gear shift lever 130 proximate a fore/aft pivot point such as pivot ball 140, and a second end of the cable/rod is coupled to a lever on the transmission. Alternatively, the shift lever assembly 114 could be electronically coupled to the transmission in a shift by wire arrangement.

Shift lever 130 is rotatably disposed within shaft cavity 120 such that gear shift lever 130 is movable through a slotted groove or opening 146, which facilitates selection of, for example, a parking position, a forward drive position (drive), a reverse position, and a neutral position. As such, gear shift lever 130, which is coupled to the transmission via the cable/rod mechanical linkage, is moved through the slotted opening 146 to shift the setting of the automatic transmission gear shifter arrangement 100. However, shift lever assembly 114 may include various other types of shift lever assemblies such as rotary, ball, and yoke pivots or any combination thereof.

Position sensor assembly 116 is configured to determine the gear position of arrangement 100 and generally includes one or more light sources 150, one or more light sensors 152, and a controller 154. Light sources 150 are disposed in light source passages 124, and light sensors 152 are disposed in light sensor passages 122.

Gear shift lever 130 includes a passage 156 extending therethrough, and gear shift lever 130 is selectively movable between sets of corresponding passages 122, 124 to enable light to be transmitted from light source 150, through passages 122, 124, and 156, to light sensor 152.

As gear shift lever 130 is moved along the slotted opening or gate 146 to the various selected gear positions of the automatic transmission gear shifter arrangement 100, passage 156 establishes a path of travel for light emitted from one light source 150 to an associated light sensor 152. A blocking device (not shown) is configured to obstruct the path of travel between a corresponding source 150 and sensor 152 when passage 156 is not disposed therebetween. Accordingly, with passage 156 disposed therebetween, light sensor 152 reacts to the emitted light and produces a signal indicating that gear shift lever 130 is in that position (e.g. in the park position). This signal may then be sent to controller 154, which may then utilize the sensed position for further applications such as vehicle stop/start applications. However, light source 150 and light sensor 152 may be positioned in various locations such that selective movement of gear shift lever 130 either establishes or disrupts a path of travel for light energy between light source 150 and sensor 152 to enable determining the gear position of shift lever 130.

Described herein are systems and methods for determining a position of a gear shift lever in a transmission gear shifter assembly. The assembly includes a position sensor assembly having a light source and a light sensor. When the shift lever (or associated linkage) is in a predetermined position, the passage formed therein allows light to travel from the light source to the light sensor. Thus, the relative position of the gear shift lever, and thus the setting of the transmission, is determinable based on whether the light sensor detects emissions from the light source. Accordingly, due to the small size of the light source and light sensor, required packaging space is reduced and positioning flexibility is subsequently increased.

It should be understood that the mixing and matching of features, elements and/or functions between various examples may be expressly contemplated herein so that one skilled in the art would appreciate from the present teachings that features, elements and/or functions of one example may be incorporated into another example as appropriate, unless described otherwise above.

What is claimed is:

1. A transmission gear shifter arrangement, comprising:
   a shift lever assembly associated with a shifter housing and configured to operably couple to a vehicle transmission, the shift lever assembly selectively movable to a plurality of gear select positions corresponding to a respective plurality of transmission gears; and
   a position sensor assembly associated with the shifter housing, the position sensor assembly including a light source and a light sensor configured to selectively receive light emitted from the light source;
   wherein, when the shift lever assembly is in a predetermined one of the plurality of gear select positions, the shift lever assembly enables light emitted from the light source to reach the light sensor thereby indicating that the shift lever assembly is in the predetermined one of the plurality of gear select positions, and when the shift lever assembly is not in the predetermined one of the plurality of gear select positions, the shift lever assembly prevents light emitted from the light source from reaching the light sensor;
   wherein the shift lever assembly includes a passage formed therethrough, and wherein when the shift lever assembly is in the predetermined one of the plurality of gear select positions, the passage receives the light emitted from the light source thereby enabling the light to reach the light sensor.

2. The gear shifter arrangement of claim 1, wherein the shift lever assembly includes a gear shift lever including a pivot ball, the pivot ball having the passage formed therethrough;
  wherein the shifter housing includes a socket configured to pivotably receive the pivot ball, and the light source and light sensor are coupled to the housing on opposed sides of the socket and in optical communication with the socket; and
  wherein when the shift lever assembly is in the predetermined one of the plurality of gear select positions, the passage, the light source, and the light sensor are aligned.

3. The gear shifter arrangement of claim 1, wherein the housing includes a light source passage and an opposed light sensor passage, and wherein the light source is disposed in the light source passage and the light sensor is disposed in the light sensor passage.

4. The gear shifter arrangement of claim 3, wherein the shift lever assembly includes a gear shift lever having a pivot ball, the pivot ball having a pivot ball passage formed therethrough, and wherein when the shift lever assembly is in the predetermined one of the plurality of gear select positions, the pivot ball passage, the light source passage, and the light sensor passage are aligned.

5. The gear shifter arrangement of claim 4, wherein the pivot ball is received in and rotatably supported by a cavity defined by the shifter housing, and wherein the pivot ball passage, the light source passage, and the light sensor passage are aligned when the shift lever assembly is in the predetermined one of the plurality of gear select positions.

6. The gear shifter arrangement of claim 1, wherein the transmission gear shifter arrangement is a manual transmission gear shifter arrangement.

7. The gear shifter arrangement of claim 6, wherein the predetermined one of the plurality of gear select positions is a neutral gear position.

8. The gear shifter arrangement of claim 1, wherein the light sensor generates a signal indicating the shift lever assembly is in the predetermined one of the plurality of gear select positions when the light sensor receives the light emitted from the light source.

9. The gear shifter arrangement of claim 8, wherein the light source is a light emitting diode.

10. The gear shifter arrangement of claim 8, further comprising a vehicle controller in signal communication with the light sensor, the vehicle controller configured to receive the signal from the light sensor.

11. The gear shifter arrangement of claim 1, wherein the transmission gear shifter arrangement is an automatic transmission gear shifter arrangement.

12. The gear shifter arrangement of claim 1, further comprising:
  a second position sensor assembly associated with the shifter housing and including a second light source and a second light sensor, the second light sensor configured to selectively receive light emitted from the second light source thereby indicating that the shift lever assembly is in a second predetermined one of the plurality of gear select positions different than the predetermined one of the plurality of gear select positions;
  wherein, when the shift lever assembly is in the second predetermined one of the plurality of gear select positions, the shift lever assembly enables light emitted from the second light source to reach the second light sensor, and when the shift lever assembly is not in the second predetermined one of the plurality of gear select positions, the shift lever assembly prevents light emitted from the second light source from reaching the second light sensor.

13. The gear shifter arrangement of claim 12, further comprising:
  a third position sensor assembly including a third light source and a third light sensor, the third light sensor configured to selectively receive light emitted from the third light source when the shift lever assembly is in a third predetermined one of the plurality of gear select positions different than the second predetermined one of the plurality of gear select positions and the predetermined one of the plurality of gear select positions;
  wherein when the shift lever assembly is in the third predetermined one of the plurality of gear select positions, the shift lever assembly enables light emitted from the third light source to reach the third light sensor, and when the shift lever assembly is not in the third predetermined one of the plurality of gear select positions, the shift lever assembly prevents light emitted from the third light source from reaching the third light sensor.

14. The transmission gear shifter arrangement of claim 13, wherein the shift lever assembly includes a gear shift lever having a pivot ball, and wherein the pivot ball includes a first passage, second passage and third passage formed therethrough and configured for selective alignment with the light source and sensor, the second light source and sensor, and the third light source and sensor, respectively.

* * * * *